United States Patent [19]

Akutagawa

[11] Patent Number: 4,480,974
[45] Date of Patent: Nov. 6, 1984

[54] CONTINUOUS AND AUTOMATIC APPARATUS FOR MOLDING CHOCOLATE BLOCK HAVING ORNAMENTAL RELIEF PATTERN

[75] Inventor: Tokuji Akutagawa, Tokyo, Japan
[73] Assignee: Akutagawa Confectionery Co., Ltd., Tokyo, Japan
[21] Appl. No.: 478,957
[22] Filed: Mar. 25, 1983
[51] Int. Cl.³ .......................... A23G 1/20; A23G 1/26
[52] U.S. Cl. ................... 425/112; 425/120; 425/126 R; 425/155; 425/215; 425/231; 425/456
[58] Field of Search ............... 425/112, 115, 117, 120, 425/126 R, 130, 163, 215, 126 R, 155, 231, 456; 426/512, 306, 307, 514, 515, 524

[56] References Cited

U.S. PATENT DOCUMENTS

| | | | |
|---|---|---|---|
| 1,797,818 | 3/1931 | Bremer | 425/126 |
| 1,894,077 | 1/1933 | Winkler et al. | 425/215 |
| 2,896,557 | 7/1959 | Aasted et al. | 426/514 |
| 3,940,218 | 2/1976 | Steels | 425/120 |
| 4,369,200 | 1/1983 | Iwao et al. | 426/512 |

Primary Examiner—Willard E. Hoag
Attorney, Agent, or Firm—Jordan and Hamburg

[57] ABSTRACT

A continuous and automatic process for molding chocolate blocks each having an ornamental relief pattern of one color and a body portion of different color carrying the relief pattern is provided. Also, there is provided apparatus for continuously and automatically producing such ornamental chocolate blocks. A first chocolate material for forming the ornamental relief pattern is cast into a first mold and scraped to scrape off the excess chocolate material. A second mold is then placed on the first mold and a second chocolate material for forming the body portion is cast into through-openings of the second mold. The second chocolate material inevitably oozing into the interface between the first and second molds adheres only onto a rough surface portion formed around and surrounding the through-openings of the second mold without the second chocolate material adhering onto the first mold. It is thus not necessary to remove the oozing chocolate material from the first mold. Further, the product chocolate block does not have burr.

12 Claims, 5 Drawing Figures

CONTINUOUS AND AUTOMATIC APPARATUS FOR MOLDING CHOCOLATE BLOCK HAVING ORNAMENTAL RELIEF PATTERN

BACKGROUND OF THE INVENTION

1. Field of the Invention

The present invention relates to a process and an apparatus for molding chocolate, and particularly to a process and an apparatus for molding chocolate blocks each including an ornamental relief pattern made of first chocolate material of one color and a body portion carrying the ornamental relief pattern and made of a second chocolate material of different color through a continuous automation system.

2. Prior Art

In a known process for molding a chocolate block having an ornamental relief pattern, a first chocolate material for forming an ornamental relief pattern is heated to be fluidized and then cast into a first or lower mold having a smooth top face and one or more engraved cavities forming the ornamental relief pattern such as desired design or letters. After scraping the top face of the first mold, the first chocolate material is cooled at some extent, and a second or upper mold having one or more through-openings is placed on the first mold. Before the first chocolate material contained in the engraved cavities of the first mold is not yet solidified, a second chocolate material having a color different from that of the first chocolate material is heated to be fluidized and then cast into the through-openings of the second mold. After the first and second chocolate materials are crystallized and solidified, the upper mold is separated from the lower mold to remove the molded chocolate block from the combined molds. However, the fluidized second chocolate material tends to penetrate into the gap inevitably formed at the interface between the top face of the lower mold and the bottom face of the upper mold. The penetrating second chocolate material adheres on the top face of the lower mold and the bottom face of the upper mold, or adheres to the body portion of the molded chocolate block to form a burr. If an appreciable quantity of the second chocolate material adheres on the top face of the lower mold at the vicinity of the engraved cavity forming the ornamental pattern, the adhering second chocolate material different from the first chocolate material in color and in quality is mixed with the first chocolate material at the scraping step of the next operation cycle, thereby to deteriorate the quality and appearance of the product, resulting in loss of commercial value of the product. In order to remove the residual second chocolate material adhering onto the top face of the lower mold surrounding the engraved cavities for molding the ornamental pattern, the lower mold must be rinsed with warm water followed by drying before it is used repeatedly in the next operation cycle. For this reason, in the conventional process for molding chocolate wherein the ornamental relief pattern is made of a first chocolate material of one color and the body portion is made of a second chocolate material of different color, the process essentially includes the step of rinsing the lower molds with warm water and the step of drying the rinsed lower molds. As a result, it is impossible to realize a simple automation system for continuously and automatically molding chocolate blocks one by one by the recycle use of the lower molds.

Although it has been contemplated to scrape off the second chocolate material adhering to the lower mold using another scraper after the molded chocolate block is removed therefrom, the lower mold is charged with static electricity by the friction with the scraper to attract fine broken pieces of the second chocolate material. It is thus difficult to remove the once adhering second chocolate material from the lower molds completely by means of the known method. It is not recommendable to scrape off the solidified chocolate material adhering to the first molds, since the top faces of the lower molds are damaged or worn by the scraper or the solidified chocolate material.

Another disadvantage of the known process resides in that cumbersome operation is required to remove the burrs adhering to the molded chocolate product to maintain the commercial value of the product.

OBJECTS AND SUMMARY OF THE INVENTION

A principal object of this invention is to provide a continuous and automatic process and apparatus for molding chocolate blocks each including an ornamental relief pattern of one color forming desired design such as letter or figure and carried by a body chocolate material of different color.

Another object of this invention is to provide a continuous and automatic process and apparatus for molding chocolate blocks each including an ornamental relief pattern of one color forming desired design such as letter or figure and carried by a body chocolate material of different color, wherein the chocolate material for forming the body portion of the product chocolate block oozing or penetrating into the interface between the top face of the first mold engraved with the ornamental pattern and the bottom face of the second mold having a cavity for containing the second chocolate material for the body of the chocolate block is allowed to adhere only onto the second mold so that the first mold is free from the adhesion of the second chocolate material to exclude the rinsing and subsequent drying steps or the step of scraping off the adhering solidified second chocolate material.

A still another object of this invention is to provide a continuous and automatic process and apparatus for molding a chocolate block having an ornamental relief pattern and having a body portion free of burr.

A further object of this invention is to provide a continuous and automatic process and apparatus for molding a chocolate block made of first and second chocolate materials which are not mixed together to form a clear ornamental pattern.

The above and other objects of this invention will become apparent from the following description of the invention.

A continuous and automatic process for molding chocolate blocks each including an ornamental relief pattern made of a first chocolate material of one color and a body portion carrying the ornamental relief pattern and made of a second chocolate material of different color, according to the present invention, comprises the steps of: (a) casting a first chocolate material for forming said ornamental relief pattern successively into a plurality of first molds each having a top face provided with at least one engraved mold cavity, at least the portion of said top face surrounding said engraved mold cavity being generally flat and smooth; (b) scraping said top faces of said first molds successively to press said first chocolate material into said engraved mold cavities and to scrape off the excess first chocolate material; (c) successively cooling said first chocolate material contained in respective first molds; (d) successively placing a second mold on each of said first molds before said first chocolate material is solidified, each of said second molds having at least one through-opening defining a mold cavity and a bottom face with at least the portion thereof surrounding said through-opening forming a generally flat rough surface portion; (e) successively casting a second chocolate material for forming said body portion into respective through-openings of said second molds before said first chocolate material is solidified to allow the second chocolate material oozing into the interface between the top face of each first mold and the bottom face of each second mold to adhere only onto said rough surface portion formed on said bottom face of each second mold; (f) successively cooling said first and second chocolate materials contained in respective combined first and second molds to solidify the same to form product chocolate blocks each having said ornamental relief pattern; and (g) successively removing said product chocolate blocks from the molds.

An apparatus for continuously and automatically molding a chocolate block including an ornamental relief pattern made of a first chocolate material of one color and a body portion carrying said ornamental relief pattern and made of a second chocolate material of different color, according to the present invention, comprises: (a) convey means for carrying thereon a plurality of first molds successively placed at intervals, each first mold having a top face provided with at least one engraved mold cavity, at least the portion of said top face surrounding said engraved mold cavity being generally flat and smooth; (b) means for casting a fluidized first chocolate material for forming said ornamental relief pattern into each of the engraved mold cavity of said mold one by one; (c) scraping means for scraping the top face of each first mold to press said first chocolate material into said engraved mold cavity and to scrape off the excess first chocolate material; (d) a first cooler for cooling said first chocolate material contained in said engraved mold cavity of said first mold; (e) means for placing a second mold in situ on said first mold, said second mold having at least one through-opening defining a mold cavity and a bottom face with at least the portion thereof surrounding said through-opening forming a flat rough surface portion; (f) means for casting a fluidized second chocolate material into said second mold combined with said first mold through said through-opening; (g) a second cooler for successively cooling said first and second chocolate materials contained in the combined first and second molds to solidify the same; and (h) means for removing the solidified first and second chocolate materials from the molds to obtain an integral product chocolate block.

DESCRIPTION OF THE PREFERRED EMBODIMENTS

Preferred embodiments of the present invention will now be described with reference to the appended drawings.

Figure 1:
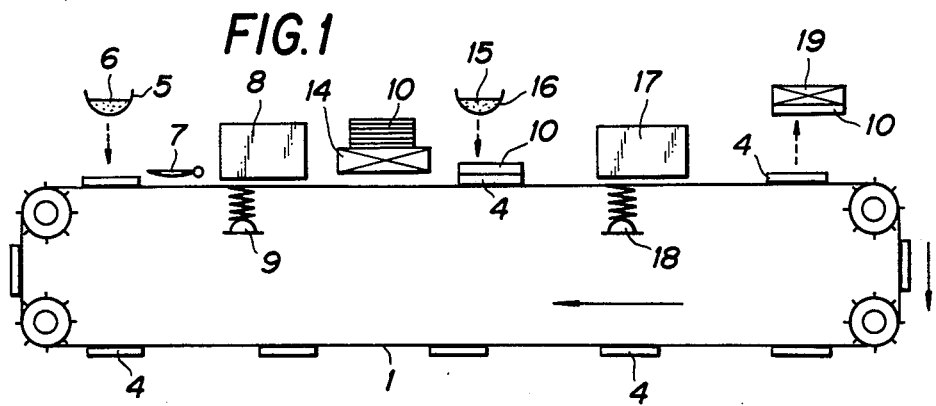
FIG. 1 is a schematic view showing the general construction of the apparatus of this invention.
Figure 2:
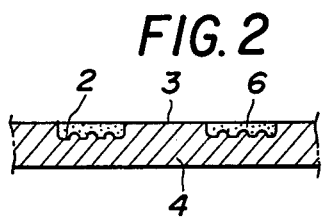
FIG. 2 is a cross section showing a portion of the first mold in which the first chocolate material is cast and then pressed into engraved mold cavity by the casting and scraping operations.

Firstly referring to FIG. 1, a conveyer 1 carries a plurality of lower or first molds 4 arranged at pre-set intervals. Although an endless belt conveyer is used in the illustrated embodiment, any other conveyer means, such as chain conveyer, may be used. The conveyer 1 is moved intermittently by a combination of a timer and a prime mover (not shown). Each of the first mold 4 has a generally flat and smooth top face 3, as shown in FIG. 2, and the top face is provided with at least one engraved mold cavity 2 for containing a first chocolate material which forms an ornamental relief pattern. At least the portion of the top face 3 surrounding the engraved mold cavity 2 should be flat and smooth, but the overall top face 3 of the first mold 4 may be generally flat and smooth and it suffices that the top face 3 has a configuration adapted to be combined snugly with the bottom face of a second or upper mold, as will be described in detail hereinafter. General materials for the first mold 4 are synthetic resins, such as polystyrene or polycarbonate, and metals.

A container 5 for storing a fluidized first chocolate material 6 is disposed above the conveyer 1, and the fluidized first chocolate material 6 is fed to the first mold 4 moved to the position just beneath the container 5 in a quantity substantially equal to the volume of the engraved mold cavity 2.

Although a so-called white chocolate material is the most preferred as the first chocolate material, the first chocolate material is not limited to the white chocolate material but may be selected from a variety of chocolate materials having desired colors by the addition of edible pigments. The first chocolate material 6 contained in the container 5 has been pretreated through the known conching and tempering steps and maintained at a temperature of about 29° to 31° C. to be fluidized.

At the downstream of the travelling direction of the conveyer 1 (the travelling direction of the conveyer 1 being shown by the real line arrow in the FIG. 1), a scraper 7 is disposed to scrape the top face 3 of the first mold 4 to press the first chocolate material 6 into the engraved mold cavity 2 and to scrape off the excess first chocolate material 6. The scraper 7 may be made of a scraper band or strip of a resilient material, for example a rubber or a synthetic resin, extending perpendicular to the travelling direction of the conveyer 1 and adapted to contact with the top face 3 of the first mold 4 as each mold 4 passes through the scraper strip. The scraper strip may be moved in the direction reverse to the travelling direction of the conveyer 1, if a rapid scraping operation is desirous. Otherwise, one end of the scraper strip is pivoted and the scraper strip is swung about the pivot axis.

The first mold 4 carrying the first chocolate material in its engraved mold cavity 2, as shown in FIG. 2, is then passed through a first cooler 8. The temperature in the first cooler 8 may be varied depending on the kind and thickness of the first chocolate material contained in the engraved mold cavity 2 of the mold 4, and generally maintained at about 4° to 7° C. The cooler 8 has a length so that each first mold 4 carrying the first chocolate material is contained therein for a residence time of generally 2 to 3 minutes during which the surface temperature of the first chocolate material is rapidly cooled to 18° to 22° C. and the base oils and fats contained in the first chocolate material are crystallized to form fine crystallites. A vibrator 9 may be provided to vibrate the first mold 4 during the cooling operation to remove air bubbles from the first chocolate material. The first chocolate material should not be solidified by this cooling step, but the cooling is effected to cool the surface temperature of the first chocolate material to about 18° to 22° C. rapidly and to crystallize the base oils and fats contained in the chocolate material. The length of the cooler 8 is adjusted or the travelling speed of the conveyer 1 is controlled such that the first mold 4 passes through the cooler 8 while the crystallization of base oils and fats in the first chocolate material is still taking place.

Figure 3:
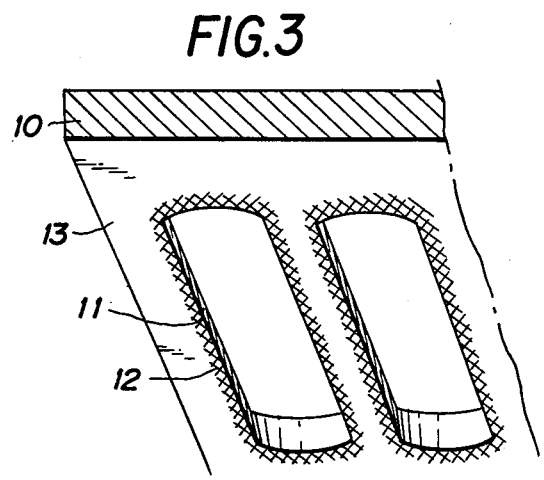
FIG. 3 is a perspective view showing a portion of the bottom face of the second mold.

Adjacent to the first cooler 8, there is disposed a device 14 for placing upper or second molds 10 successively on respective first molds 4. As shown in FIG. 3, each second mold 10 has at least one through-opening 11 which forms a mold cavity defining the final contour of the molded chocolate block. The depth of the through-opening 11 is not critical and may be varied to obtain a product chocolate block having a desired thickness. The second mold 10 has a bottom face 13, and the portion of the bottom face 13 surrounding the through-opening 11 is generally level or flat and rough to form a rough surface area 12. The rough surface area 12 does not necessarily extend over the entire bottom face 13. However, overall bottom face 13 of the second mold 10 may be formed by the rough surface area. It is not essential that the whole regions of the top face 3 of the first mold 4 and the bottom face 13 of the second mold 10 are flat or level, but it suffices that at least the portion of the top face 3 of the first mold 4 surrounding the engraved cavity 2 is flat and smooth and at least the portion of the bottom face 13 of the second mold 10 is flat or level and rough so that the second mold 10 is placed on the first mold 4 with the top face 3 contacting closely to the bottom face 13 to form combined molds. The second mold 10 may be, in general, made of a synthetic resin, such as polystyrene or polycarbonate, or a metallic material. The rough face 12 may be formed by scratching the bottom face 13 of the second mold 10 in one direction or in plural directions using a sand paper or a grinder. The degree of roughness is not critical. However, in order to allow the fluidized second chocolate material to adhere selectively and firmly only onto the rough surface of the second mold, the depth of the scratches ranges preferably from 50 microns to 2 mm, more preferably from 100 to 300 microns. In the illustrated embodiment shown in FIG. 1, a plurality of second molds is stacked on the device 14 to be successively combined in situ with respective first molds 4 one by one as the first molds 4 are moved intermittently to the position just beneath the device 14.

A second chocolate material 15 is contained in a second container 16 disposed next to the device 14 and is stored in the container 16 in the condition similar to that described hereinbefore as to the condition of the first chocolate material. The second chocolate material 15 is poured or cast into the through-opening 11 of the second mold 10 in a quantity substantially equal to the volume of the mold cavity defined by the through-opening 11, when one of the second molds 10 is positioned just beneath the second container 16 while containing the first chocolate material which is not solidified and still in the course of crystallization of the base oils and fats contained therein.

Figure 4:
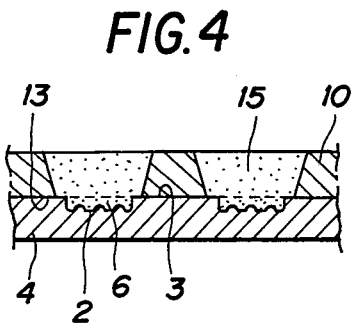
FIG. 4 is a cross section showing a portion of the combined first and second molds in which the first and second chocolate materials are contained.

Although not shown in the drawings, means for scraping the top face of each second mold 10 may be provided. FIG. 4 shows the second chocolate material 15 cast in the combined first and second molds 4 and 10. The second chocolate material may be a regular brown chocolate material or may be a variety of chocolate materials having a color different from that of the first chocolate material. However, in order to produce a chocolate block having an ornamental relief pattern of first chocolate material which is integrally joined with the second chocolate material forming the body portion of the chocolate block, the contents and kinds of the base oils and fats contained in the first and second chocolate materials should be determined in consideration of the melting points and percentage shrinkages thereof. The contents and kinds of the base oils and fats should be controlled to produce a final chocolate block having clear ornamental pattern having a color which is in good contrast with the color of the body portion. In this connection, co-pending Japanese patent application No. 57839/1981 disclosing an invention invented by me will be incorporated herein as a reference. Similarly to the first chocolate material, the second chocolate material is stored in the second container 16 generally at a temperature of from 29° to 31° C. However, the storage temperature is not limited as far as the chocolate material is stored in a fluidized state.

Then, the combined first and second molds 4 and 10 pass through a second cooler as the conveyer 1 moves intermittently, whereupon the first and second chocolate materials are solidified to form an integral chocolate block. The temperature and time for cooling to solidify the chocolate block are varied depending on the thickness of the body portion of the block, and it takes generally about 15 to 25 minutes to solidify the chocolate material cast at a temperature of from 29 to 31° C. in a cooler maintained at 4° to 7° C. A vibrator 18 may be provided to vibrate the combined first and second molds 4 and 10 during this second cooling step thereby to remove air bubbles in the second chocolate material.

Figure 5:
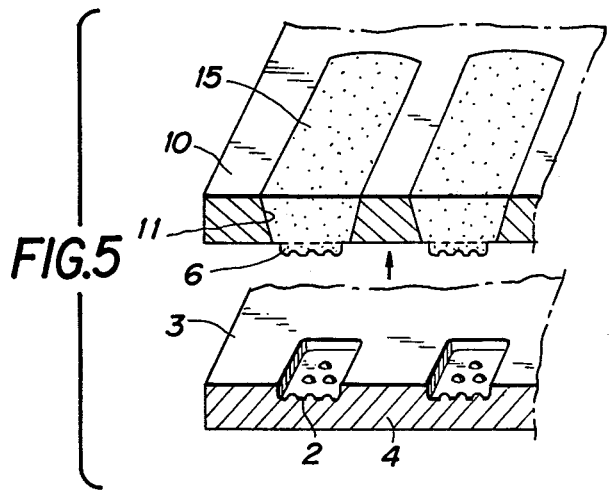
FIG. 5 is a partially broken perspective view showing a portion of the first mold and a portion of the second mold, at which the first mold is separated from the second mold and the molded chocolate block is carried by the second mold.

Then, the second mold 10 is raised by a mold separator 19 while leaving the first mold 4 on the conveyer 1, whereby the solidified first chocolate material 6 adhering onto the solidified second chocolate material 15 is taken out of the first mold 4, as shown in FIG. 5. Since the side wall of the through-opening 11 of the second mold 10 is slightly tapered such that the through-opening 11 expands upwardly, the molded chocolate block is carried by the second mold 10. The molded chocolate block having an ornamental relief pattern may be removed from the second mold 10 by inverting the second mold 10.

The important advantage attained by this invention resides in that all of the oozing second chocolate material 15 which penetrates into the interface gap inevitably formed between the top face 3 of the lower mold 4 and the bottom face 13 of the upper mold 10 adheres only onto the rough surface portion 12 of the bottom face 13 of the upper mold 10 surrounding the through-opening 11 and does not adhere onto the smooth top face 3 of the lower mold 4, and that the second chocolate material 15 thus adhering onto the rough surface portion 12 of the upper mold 10 is all attached to the increased surface areas of the scratches and then shrinked by cooling to be confined in the concaved portions of the rough surface portion 12, leaving the flat and smooth top face 3 of the lower mold 4 free of the second chocolate material 15. Therefore, according to the present invention, the only operation required for preparatory to the next cycle molding is cleaning of the second chocolate 15 adhering onto the bottom face 13 of the upper mold 10, and it is not required to clean the lower mold 4. Thus, the time consuming rinsing and drying operations or the troublesome scraping operation, otherwise called for in the known process, can be excluded. Moreover, even the step of cleaning the upper mold 10 may be omitted until the bulk of adhering second chocolate material reaches the significant extent at which intimate engagement between the top face 3 of the lower mold 4 and the bottom face 13 of the upper mold 10 would be impeded.

A further advantage attained by this invention is that the first chocolate material 6 is not mixed with the second chocolate material 15 at the next cycle operation of casting the first chocolate material 6 into the engraved cavity 2 of the lower mold 4 followed by scraping to press the first chocolate material 6 into the engraved cavity 2. As a result, the chocolate block produced in accordance with the present invention has clear and distinctive ornamental pattern without the fear that the relief pattern made of the first chocolate material 6 is blurred by the mixed second chocolate material 15. Another advantage attained by the present invention is that the life time of the lower mold 4 can be prolonged, since the top face 3 of the lower mold 4 is not necessarily scrubbed by a spatula or pallet because of the fact that the second chocolate material 15 does not adhere onto the smooth and flat face of the lower mold 4. A still further advantage attained by the present invention is that the oozing second chocolate material 15 is steadily held by the rough surface portion 12 surrounding the through-opening 11 of the upper mold 10, and readily separated from the solidified body portion of the chocolate block spontaneously at the step of removing the product chocolate block from the mold 10. Accordingly, the product molded by the process or apparatus of the present invention is free of burr to eliminate the need of cumbersome burr removal operation.

Although the present invention has been described with reference to the preferred embodiments, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. An apparatus for continuously and automatically molding a chocolate block including an ornamental relief pattern made of a first chocolate material of one color and a body portion carrying said ornamental relief pattern and made of a second chocolate material of different color, comprising:
    (a) conveyer means for carrying thereon a plurality of first molds successively placed at intervals, each first mold having a top face provided with at least one engraved mold cavity, at least the portion of said top face surrounding said engraved mold cavity being flat and smooth;
    (b) means for casting a fluidized first chocolate material for forming said ornamental relief pattern into each of the engraved mold cavities of said first molds one by one;
    (c) scraping means for scraping the top face of each first mold to press said first chocolate material into said engraved mold cavity and to scrape off the excess first chocolate material;
    (d) a first cooler for cooling said first chocolate material contained in said engraved mold cavity of said first mold;
    (e) means for placing a second mold in situ on said first mold, said second mold having at least one through-opening defining a mold cavity and a bottom face with at least the portion thereof surrounding said through-opening forming a generally flat rough surface portion said portion having a surface roughness extending from said bottom face in the range of 50 microns to 2 mm;
    (f) means for casting a fluidized second chocolate material into said second mold combined with said first mold through said through-opening;
    (g) a second cooler for successively cooling said first and second chocolate materials contained in the combined first and second molds to solidify the same; and
    (h) means for removing the solidified first and second chocolate materials from the molds to obtain an integral product chocolate block.

2. The apparatus as claimed in claim 1, wherein said scraper means comprises a scraper strip made of a resilient material and pivoted at one end thereof for swinging movement across said top face of said first mold.

3. The apparatus as claimed in claim 1, wherein said first cooler is provided with a vibrator.

4. The apparatus as claimed in claim 1, wherein a plurality of second molds are stacked in said means (e) to be placed on respective first molds.

5. The apparatus as claimed in claim 1, wherein said second cooler is provided with a vibrator.

6. The apparatus as claimed in claim 1, wherein said means (h) comprises a mold separator for separating said first mold from said second mold, and means for turning said second mold upside down.

7. The apparatus as claimed in claim 1, further comprising a timer for actuating said conveyer intermittently at pre-set time intervals.

8. The apparatus as claimed in claim 1, further comprising scraper means for successively scraping the top faces of said second molds to press said second chocolate material into said through-opening and to scrape off the excess second chocolate material.

9. The apparatus as claimed in claim 1, wherein said scraper means comprises a scraper strip made of a resilient material and extending substantially perpendicular to the travelling direction of said conveyer, said scraper strip being in contact with said top face of said first mold as said first mold passes through said scraper strip.

10. The apparatus as claimed in claim 9, further comprising means for moving said scraper strip in the direction reverse to the travelling direction of said conveyer.

11. The apparatus as claimed in claim 1, wherein said rough surface portion of said bottom face of each second mold includes a plurality of scratches extending in one or more directions and having the depth ranging from 50 microns to 2 mm.

12. The apparatus as claimed in claim 11, wherein the depth of the scratches in the rough surface portion of said bottom face of each second mold is in the range of 100 to 300 microns.

* * * * *